United States Patent [19]
Goetz et al.

[11] Patent Number: 5,104,924
[45] Date of Patent: Apr. 14, 1992

[54] PREPARATION OF REINFORCED, IMPACT-MODIFIED THERMOPLASTIC MOLDING COMPOSITIONS

[75] Inventors: Walter Goetz, Ludwigshafen; Gerd Blinne, Bobenheim; Herbert Gutsche, Beindersheim; Rolf Steinberger, Schifferstadt, all of Fed. Rep. of Germany

[73] Assignee: BASF Aktiengesellschaft, Ludwigshafen, Fed. Rep. of Germany

[21] Appl. No.: 557,774

[22] Filed: Jul. 26, 1990

[30] Foreign Application Priority Data

Aug. 16, 1989 [DE] Fed. Rep. of Germany ....... 3926904

[51] Int. Cl.$^5$ ............................................. C08L 23/06
[52] U.S. Cl. .................................... 524/508; 524/513; 524/514
[58] Field of Search ......................... 524/508, 513, 514

[56] References Cited

U.S. PATENT DOCUMENTS 4,983,660 1/1991 Yoshida et al. ...................... 524/369

FOREIGN PATENT DOCUMENTS 0136540 4/1985 European Pat. Off. .
0327983 8/1989 European Pat. Off. .
2622973 12/1976 Fed. Rep. of Germany .
3804161 8/1989 Fed. Rep. of Germany .

*Primary Examiner*—Paul R. Michl
*Assistant Examiner*—Edward Cain
*Attorney, Agent, or Firm*—Oblon, Spivak, McClelland, Maier & Neustadt

[57] ABSTRACT

The invention relates to a process for the preparation of reinforced, impact-modified thermoplastic molding compositions which contain, based on 100 parts by weight,
  A) from 30 to 93 parts by weight of one or more thermoplastics from the group comprising the polyamides, polyesters, polycarbonates and polyphenylene ethers,
  B) from 5 to 50 parts by weight of fibers, preferably glass fibers, and
  C) from 2 to 20 parts by weight of one or more impact-modifying rubbers, in which process
  the fibers (B) are first introduced into the melt of the thermoplastic (A),
  components (A) and (B) are mixed,
  the rubber (C) is then introduced into the resultant mixture in the melt, and
  the resultant molding composition is extruded and granulated, wherein the reaction is carried out in one step, expediently at a constant temperature in the range of, advantageously, from 250° to 300° C.

6 Claims, No Drawings

PREPARATION OF REINFORCED, IMPACT-MODIFIED THERMOPLASTIC MOLDING COMPOSITIONS

The present invention relates to a process for the preparation of fiber-reinforced, impact-modified thermoplastic molding compositions in which first the fibers (B) and then the rubber (C) are introduced into the melt of the thermoplastics (A), and the reaction is carried out in one step, expediently at from 250° to 300° C.

Polyamides, polyesters, polycarbonates and polyphenylene ethers are thermoplastics which, due to their good properties, have been introduced into many areas as structure materials.

The impact modification and modification with fillers of these thermoplastics are also known per se and are described in the literature.

Only as an example, reference is made here to DE-A-2,622,973 (U.S. Pat. No. 4,174,358), which describes the impact modification of polyamides by means of olefin polymers containing acid groups. The description states that the compositions may also contain fillers.

According to DE-A-3,804,161, filler-containing thermoplastic molding compositions based on one or more thermoplastics from the group comprising the polyamides, polyesters and polyphenylene ethers, one or more fibrous or particulate fillers and an impact-modifying rubber mixture which comprises rubbers derived from acid-functional or latently acid-functional monomers and rubbers which are free from groups of monomers of this type have an improved sliding friction behavior and reduced abrasion in addition to good mechanical properties. The only mention made in the patent description of the preparation of the molding compositions is that the synthesis components are mixed, melted at 280° C. in an extruder, extruded and granulated.

Furthermore, EP-B-0,136,540 (U.S. Pat. No. 4,574,131) discloses a two-step process for the preparation of impact-modified polyamide molding compositions in which, in the 1st step, the silicate fillers coated with an organosilane and a polyurethane ionomer are first mixed with the polyamide above the melting point thereof and, in the 2nd step, the thermoplastic elastomers are finely distributed in the filler-containing polyamide above the melting point thereof. According to the examples, which are to be regarded as preferred process variants, the coated glass fibers are incorporated into molten polycaprolactam in a twin-screw kneader, the melt is then discharged, cast to form extrudates, cooled and granulated. The filler-containing granules obtained are subsequently mixed with the elastomer at room temperature, the mixture is re-melted in the extruder and homogenized, the melt is cast to form extrudates, which are cooled and granulated, and test specimens are injection-molded from the granules obtained. This technique gives molding compositions of good toughness. However, it is disadvantageous in the procedure described, which is also associated with high energy costs, that the repeated melting of the fiber-containing polyamide batch causes thermal degradation of the thermoplastic. A further disadvantage is that the fibers are considerably shortened on re-melting, which significantly reduces the rigidity and strength of the molding compositions.

It was an object of the present invention to overcome, if possible fully but at least partly, the abovementioned disadvantages and to prepare fiber-containing, impact-modified thermoplastic molding compositions having relatively high tensile strength.

We have found that, surprisingly, this object is achieved by a process for the preparation of reinforced, impact-modified thermoplastic molding compositions which contain or preferably comprise, based on 100 parts by weight, A) from 30 to 93 parts by weight, preferably from 60 to 84 parts by weight, of one or more thermoplastics from the group comprising the polyamides, polyesters, polycarbonates and polyphenylene ethers, B) from 5 to 50 parts by weight, preferably from 10 to 35 parts by weight, of fibers, preferably glass fibers, and C) from 2 to 20 parts by weight, preferably from 6 to 15 parts by weight, of one or more impact-modifying rubbers, in which
the fibers (B) are first introduced into the melt of the thermoplastics (A),
components (A) and (B) are mixed,
the rubber (C) is then introduced into the resultant mixture in the melt, and
the resultant molding composition is extruded and granulated,
wherein the reaction is carried out in one step.

The invention furthermore relates to specific embodiments of the process according to the invention as claimed in the claims 2 to 6.

According to the preferred process variant, the reaction is carried out in one step at from 250° to 300° C., in particular from 280° to 290° C. In another, particularly preferred procedure, first the fibers (B) and then the rubbers (C) are introduced into the melt of the thermoplastics (A) in the abovementioned temperature range, and the reaction is carried out at a constant temperature or essentially constant temperature which may vary considerably depending on the thermoplastic employed or the plastic mixture used, it being essential to the invention, however, that the fiber-containing melt of the thermoplastics does not set or become solid in another manner at any point during the reaction before addition of the rubber.

The following details apply to the synthesis components which are suitable for the preparation of the molding compositions by the process according to the invention:

(A) The components (A) present in the molding compositions comprise, based on 100 parts by weight, from 30 to 93 parts by weight of a thermoplastic from the group comprising the polyesters, polycarbonates, polyphenylene ethers and preferably polyamides, or mixtures 2 or more of the thermoplastics mentioned.

Component (A) in the molding compositions preferably comprises, based on 100 parts by weight, one or more polyamides (A1), for example in an amount of from 0 to 93 parts by weight, preferably from 20 to 80 parts by weight, in particular from 25 to 70 parts by weight.

Semicrystalline or amorphous polyamides having a molecular weight (weight average) of 5,000 or more, as described, for example, in U.S. Pat. Nos. 2,071,250, 2,071,251, 2,130,523, 2,130,948, 2,241,322, 2,312,966, 2,512,606 and 3,393,210, are preferred.

Examples of these are polyamides derived from lactams having from 7 to 13 ring members, such as polycaprolactam, polycaprylolactam and polylaurolactam, and polyamides obtained by reacting dicarboxylic acids with diamines. Dicarboxylic acids which can be employed are alkanedicarboxylic acids having from 6 to 12, in particular from 6 to 10, carbon atoms and aromatic dicarboxylic acids. Specific examples of dicarboxylic acids are adipic acid, azelaic acid, sebacic acid, dodecanedioic acid and terephthalic and/or isophthalic acid.

Suitable diamines are in particular alkanediamines having from 6 to 12, in particular from 6 to 8, carbon atoms, and m-xylylenediamine, di(4-aminophenyl)methane, di(4-aminocyclohexyl)methane, 2,2-di(4-aminophenyl)propane or 2,2-di(4-aminocyclohexyl)propane.

Also suitable are polyamides obtained by copolycondensation of two or more of the abovementioned monomers, or mixtures of several polyamides.

Specific examples are also partially aromatic copolyamides, in particular those whose units are derived from terephthalic acid and hexamethylenediamine, adipic acid and hexamethylenediamine or terephthalic acid, hexamethylenediamine and ε-caprolactam. Copolyamides whose triamine content (content of bishexamethylenetriamine) is less than 0.5% by weight are particularly suitable. Appropriate products can be obtained in accordance with European Laid-Open Applications EP-OS 129,195 and EP-OS 129,196.

Finally, polyamides obtainable, for example, by condensation of 1,4-diaminobutane with adipic acid at elevated temperature (nylon-4,6) may also be mentioned. Preparation processes for polyamides of this structure are described, for example, in EP-A 38,094, EP-A 38,582 and EP-A 39,524.

Suitable materials for component (A) are furthermore commercially available thermoplastic polyesters (A2), which are present in 100 parts by weight of the molding compositions to the extent of from 0 to 93 parts by weight, preferably from 20 to 80 parts by weight, in particular from 25 to 75 parts by weight.

Preferred polyesters are those containing an aromatic ring in the main chain. These may also be substituted, for example by halogens, such as fluorine, chlorine and bromine, and by $C_1-C_4$-alkyl, eg. methyl, ethyl, i- or n-propyl, and i-, n- or t-butyl.

Polyesters of this type can be prepared in a conventional manner by reacting dicarboxylic acids, their esters or derivatives which form other esters with dihydroxyl compounds.

Examples of suitable dicarboxylic acids are aliphatic and aromatic dicarboxylic acids, which may also be employed in mixtures. Naphthalenedicarboxylic acids, terephthalic acid, isophthalic acid, adipic acid, azelaic acid, sebacic acid, dodecanedioic acid and cyclohexanedicarboxylic acids, and mixtures of these carboxylic acids and their ester-forming derivatives may be mentioned here only by way of example.

Preferred dihydroxyl compounds are diols having from 2 to 6 carbon atoms, particularly preferably ethylene glycol, 1,4-butanediol, 1,4-butenediol and 1,6-hexanediol; however, it is also possible to employ 1,4-hexanediol, 1,4-cyclohexanediol, 1,4-di(hydroxymethyl)cyclohexane, bisphenol A, neopentyl glycol, mixtures of these diols, and ester-forming derivatives thereof.

Polyesters made from terephthalic acid and a $C_2-C_6$-diol component, such as polyethylene terephthalate and polybutylene terephthalate, are particularly preferred.

The relative viscosity $\eta_{spec}/c$ of polyesters of this type, measured using a 0.5% strength by weight solution in a mixture of phenol and ortho-dichlorobenzene (weight ratio 3:2) at 25° C. is generally in the range from 1.2 to 1.8 dl/g.

Suitable materials for component (A) are also conventional, commercially available polycarbonates (A3), which can be employed in an amount of from 0 to 93 parts by weight, preferably from 20 to 80 parts by weight, in particular from 25 to 75 parts by weight, in 100 parts by weight of the molding composition. Aromatic polycarbonates obtainable by polycondensation of aromatic dihydroxyl compounds, in particular bisphenol A or derivatives thereof, with carbonic acid or preferably derivatives thereof, for example phosgene or diphenyl carbonate, are preferred. Corresponding polycarbonates are described in the literature, and further discussion here is therefore superfluous.

Materials used for component (A) may also be conventional, commercially available polyphenylene ethers (A4), which are used in an amount of from 0 to 93 parts by weight, preferably from 10 to 80 parts by weight, in particular from 25 to 70 parts by weight, in 100 parts by weight of the molding composition.

By way of example only, some polyphenylene ethers are listed here, as mentioned, inter alia, in O. Olabisy, Polymer-Polymer Miscibility, 1979, pages 224 to 230 and 245. These are poly(2,6-diethyl-1,4-phenylene) oxide, poly(2-methyl-6-ethyl-1,4-phenylene) oxide, poly(2-methyl-6-propyl-1,4-phenylene) oxide, poly(2,6-dipropyl-1,4-phenylene) oxide, poly(2-ethyl-6-propyl-1,4-phenylene) oxide, preferably poly(2,6-dimethyl-1,4-phenylene) oxide, or copolymers, for example those containing 2,3,6-trimethylphenol; and in addition mixtures of polymers of this type. However, poly(2,6-dimethyl-1,4-phenylene) oxide is particularly preferred.

Mixtures of polyphenylene ethers and styrene polymers, also covered here under the term polyphenylene ethers, are also commercially available.

The polyphenylene ethers employed generally have a molecular weight (weight average) in the range from 10,000 to 80,000, preferably from 15,000 to 60,000.

Processes for the preparation of such products are known to those skilled in the art, and further details here are therefore superfluous.

The above-described thermoplastics (A1) to (A4) may be employed alone or in the form of mixtures of two or more of the thermoplastics (A1) to (A4), with the proviso that the proportion by weight of one of components (A1) to (A4) or of the mixture is from 30 to 93 parts by weight in 100 parts by weight of the molding composition.

Of mixtures of this type, there has recently been increasing interest in particular in blends of polyphenylene ethers and polyamides. In blends of this type, modified polyphenylene ethers are preferred, as described, for example, in EP-A 226,910, WO-A 87/0540, WO-A 86/0286 and EP-A 253,123. For further details on the preparation of modified polyphenylene ethers of this type, reference is made to these publications.

(B) The component (B) present in the thermoplastic molding compositions according to the invention comprises from 5 to 50 parts by weight, preferably from 10 to 35 parts by weight, based on 100 parts by weight, of one or more fiber as reinforcing agent.

Examples of suitable fibers are glass fibers, carbon fibers and aramid fibers, glass fibers being preferred.

When glass fibers are used, they may be finished with a size and an adhesion promoter in order to impart better compatibility with the thermoplastic (A). In general, the glass fibers used have a diameter in the range from 6 to 20 μm.

These glass fibers can be incorporated either in the form of short glass fibers or in the form of continuous extrudates (rovings). In the finished injection molding, the mean length (arithmetic mean) of the glass fibers is preferably in the range from 0.1 to 1 mm, in particular from 0.15 to 0.5 mm.

(C) As impact-modifying rubber (C), 100 parts by weight of the molding compositions contain from 2 to 20 parts by weight, preferably from 6 to 15 parts by weight, of a rubber which contains from 0.5 to 60% by weight, preferably from 1 to 20% by weight, of groups derived from acid-functional or latently acid-functional monomers.

In principle, suitable rubbers for component (C) are all those which, when blended with the thermoplastics (A1) to (A4), are accompanied by an improvement in the impact strength and can be grafted or copolymerized with the latently acid-functional or acid-functional monomers.

Specific representatives of acid-functional or latently acid-functional monomers are acrylic acid, methacrylic acid, tertiary alkyl esters of these acids, in particular tert.-butyl acrylate, and dicarboxylic acids, eg. maleic acid and fumaric acid, or derivatives of these acids, and the monoesters thereof.

In the context of the present invention, latently acid-functional monomers are compounds which form free acid groups under the polymerization conditions or on incorporation of the rubbers (C) into the molding compositions. Specific examples are anhydrides of dicarboxylic acids having up to 20 carbon atoms, in particular maleic anhydride, and tertiary $C_1$–$C_{12}$-alkyl esters of the abovementioned acids, in particular the abovementioned tert.-butyl acrylate and tert.-butyl methacrylate.

In general, the rubbers copolymerized or grafted with acid-functional or latently acid-functional monomers are copolymers which are preferably built up from 2 or more of the following monomers as principal components: ethylene, propylene, butadiene, isobutene, isoprene, chloroprene, vinyl acetate, styrene, acrylonitrile, and esters of acrylic acid and methacrylic acid having from 1 to 18 carbon atoms in the alcohol component.

Some preferred types of such elastomers are presented below.

The first preferred group comprises the ethylenepropylene (EPM) and ethylene-propylene-diene (EPDM) rubbers, which preferably have an ethylene:propylene ratio in the range from 40:60 to 90:10.

The Mooney viscosities (MLI+4/100° C.) of uncrosslinked EPM or EPDM rubbers of this type (gel contents generally below 1% by weight) are preferably in the range from 25 to 100, in particular from 35 to 90 (measured in accordance with DIN 53 523 using the large rotor after a run time of 4 minutes at 100° C.).

EPM rubbers generally contain virtually no double bonds, whereas EPDM rubbers may contain from 1 to 20 double bonds/100 carbon atoms.

Examples of diene monomers for EPDM rubbers are conjugated dienes, such as isoprene and butadiene, non-conjugated dienes having from 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene, and 2-isopropenyl-5-norbornene, and tricyclodienes, such as 3-methyltricyclo[5.2.1.0.2.6]-3,8-decadiene, or mixtures thereof. Preference is given to hexadiene-1,5,5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers are preferably grafted with acid-functional or latently acid-functional monomers. Specific examples of monomers which are suitable for this grafting are acrylic acid, methacrylic acid and derivatives thereof, and maleic anhydride.

A further group of preferred rubbers are copolymers of ethylene with acrylic acid and/or methacrylic acid and/or the esters of these acids. In addition, the rubbers may also contain dicarboxylic acids, eg. maleic acid and fumaric acid or derivatives of these acids, eg. esters and anhydrides, and/or epoxy groups. These dicarboxylic acid derivatives or epoxy groups are preferably incorporated into the rubber by adding monomers of the general formula I or II or III or IV containing dicarboxylic acid groups or epoxy groups to the monomer mixture

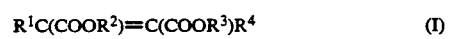

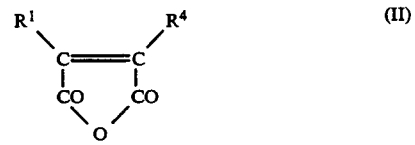

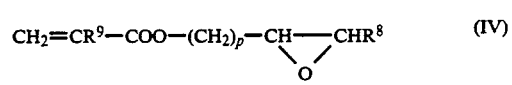

where $R^1$–$R^9$ are hydrogen or alkyl having from 1 to 6 carbon atoms, and m is an integer from 0 to 20, n is an integer from 0 to 10, and p is an integer from 0 to 5.

$R^1$–$R^7$ are preferably hydrogen, and it is preferred that m is 0 or 1 and n is 1. The corresponding compounds are maleic acid, fumaric acid, maleic anhydride, alkyl glycidyl ether or vinyl glycidyl ether.

Preferred compounds of the formulae I, II and III are maleic acid, maleic anhydride and epoxy-containing esters of acrylic acid and/or methacrylic acid, glycidyl acrylate and glycidyl methacrylate being particularly preferred.

The ethylene content of the copolymers is generally in the range from 50 to 98% by weight, and the proportion of acid-functional or latently acid-functional monomers and the proportion of esters of acrylic acid and/or methacrylic acid or of the epoxy-containing monomers is in each case in the range from 1 to 49% by weight.

Particularly preferred copolymers are those comprising from 50 to 98% by weight, in particular from 60 to 95% by weight, of ethylene, from 0.5 to 40% by weight, in particular from 1 to 20% by weight, of acrylic acid and/or maleic anhydride, and from 1 to 45% by weight, in particular from 10 to 35% by weight, of n-butyl acrylate and/or 2-ethylhexyl acrylate and/or glycidyl acrylate and/or glycidyl methacrylate.

Further preferred esters of acrylic acid and/or methacrylic acid are the methyl, ethyl, propyl and i-butyl esters.

In addition, vinyl esters and vinyl ethers can also be employed as comonomers.

The above-described ethylene copolymers can be prepared by conventional processes, preferably by random copolymerization under superatmospheric pressure and elevated temperature. Corresponding processes are described in the literature.

The melt flow index of the ethylene copolymers is generally in the range from 1 to 80 g/10 min (measured at 190° C. and under a load of 2.16 kg).

Preferred elastic rubbers (C) are furthermore graft copolymers containing butadiene, butadiene/styrene, butadiene/acrylonitrile and acrylates as the graft base, as described, for example, in DE-A-1,694,173 and DE-A-2,348,377.

Of these, particular preference is given to the ABS polymers, as described in DE-A-2,035,390, DE-A-2,248,242 and EP-A-22,216, the latter being particularly preferred.

The rubber (C) may also be a graft polymer comprising from 25 to 98% by weight of an acrylate rubber having a glass transition temperature of below $-20°$ C. as the graft base (base polymer)

and from 2 to 75% by weight of a copolymerizable, ethylenically unsaturated monomer whose homopolymers or copolymers have a transition temperature of greater than 25° C., as the graft shell.

The graft base is an acrylate or methacrylate rubber which may contain up to 40% by weight of further comonomers. The $C_1$–$C_8$-esters of acrylic acid or methacrylic acid and the halogenated derivatives thereof, and also aromatic acrylates and mixtures thereof are preferred. Examples of comonomers in the graft base are acrylonitrile, methacrylonitrile, styrene, α-methylstyrene, acrylamides, methacrylamides and vinyl $C_1$–$C_6$-alkyl ethers.

Particularly preferred graft bases are emulsion polymers having a gel content of greater than 60% by weight (determined in dimethylformamide at 25° C. by the method of M. Hoffmann, H. Krömer, R. Kuhn, Polymeranalytik, Georg-Thieme-Verlag, Stuttgart, 1977).

Further suitable graft bases are acrylate rubbers having a diene core, as described, for example, in EP-A-50,262.

Particularly suitable graft monomers are styrene, α-methylstyrene, acrylonitrile, methacrylonitrile and methyl methacrylate, or mixtures thereof, in particular those comprising styrene and acrylonitrile in the weight ratio from 1:1 to 9:1.

The graft yield, ie. the quotient of the amount of grafted-on monomers and the amount of graft monomer employed is generally in the range from 20 to 80%.

Acrylate-based rubbers which can be used according to the invention are described, for example, in DE-A-2,444,584 and DE-A-2,726,256.

The rubbers (C) preferably have a glass transition temperature of below $-30°$ C., in particular below $-40°$ C.

The groups derived from acid-functional or latently acid-functional monomers are preferably introduced into the above-described graft copolymers by carrying out the grafting in the presence of the corresponding monomers. The content of the corresponding monomers in the graft monomer mixture is from 0.5 to 50% by weight, preferably from 1 to 20% by weight, in particular from 1 to 10% by weight, corresponding to the proportion of such groups.

It is of course also possible to employ mixtures of the abovementioned rubber types.

In addition to the essential components (A) to (C), the molding compositions may also contain customary additives and processing auxiliaries.

Their proportion is generally up to 20% by weight, preferably up to 10% by weight, based on the total weight of the components (A) to (C).

Examples of customary additives are stabilizers and antioxidants, agents counteracting thermal decomposition and decomposition due to ultra-violet light, lubricants and mold release agents, colorants, such as dyes and pigments, and plasticizers.

Examples of antioxidants and heat stabilizers which can be added to the thermoplastic molding compositions are halides of metals of Group I of the Periodic Table, eg. sodium halides, potassium halides and lithium halides, alone or in combination with copper(I) halides, eg. copper chlorides, copper bromides or copper iodides. In addition, sterically hindered phenols, hydroquinones, substituted representatives of this group and mixtures thereof, preferably in concentrations of up to 1% by weight, based on the weight of components (A) to (C), can also be employed.

Examples of UV stabilizers are various substituted resorcinols, salicylates, benzotriazoles and benzophenones, whose proportion is generally not more than 2% by weight, based on the weight of components (A) to (C).

Lubricants and mold release agents, which are generally added to the thermoplastic molding compositions in amounts of up to 1% by weight, are stearic acids, stearyl alcohol, alkyl stearates and stearamides, and esters of pentaerythritol with long-chain fatty acids.

It is an essential feature of the invention that the reaction is carried out in one step. A further essential feature is the sequence in which the synthesis components (A) to (C) are combined, it being necessary to ensure, in particular, that (as stated above) the melt of (A) and (B) does not set or solidify in any other way before (C) is added, which would mean that it would have to be re-melted in accordance with the prior art.

In the invention, the fibers (B), preferably glass fibers, are first mixed with one or more thermoplastics (A) above the melting point thereof, expediently at from 250° to 300° C. The temperature depends essentially on the melting point of the thermoplastic or thermoplastic mixture used in each case. Examples of suitable mixers are single- or multiple-screw extruders, as are conventional in the plastics industry. The rubber (C) is introduced directly into the resultant homogeneous melt of (A) and (B) in the same mixer. The melt obtained in this way is then extruded and granulated.

The molding compositions prepared by the process according to the invention have improved tensile strength while the other mechanical properties are virtually unchanged.

The reinforced, impact-modified thermoplastic molding compositions are used, in particular, for the production of moldings.

EXAMPLES

The following starting materials were employed for the preparation of the thermoplastic molding compositions.

Component A: Polyhexamethyleneadipamide having a relative viscosity, measured in 1% strength by weight solution in concentrated sulfuric acid (96%), of 2.7.

Component B: Continuous extrudates of E-glass fibers which have been surface-treated with aminosilane (Silenka ® 095).

Component C: Ethylene-propylene rubber (ethylene/propylene weight ratio 45:55) grafted with 1% by weight of maleic anhydride; MFI 150 g/10 min at 230° C. and a load of 21.6 kg.

COMPARATIVE EXAMPLE I

The molding composition was prepared by melting 70 parts by weight of component (A) in a Werner und Pfleiderer, Stuttgart, ZSK 53 extruder at 280 C, and 30 parts by weight of component (B) were introduced into the melt. After a mean residence time of 100 seconds, the homogeneous melt was extruded and granulated. The mechanical properties shown in the table below were measured on moldings produced from these granules.

COMPARATIVE EXAMPLE II 86 parts by weight of a component (A) reinforced with 35% by weight, based on the total weight, of component (B) were mixed at room temperature with 10 parts by weight of components (C) and 4 parts by weight of component (A), the mixture was introduced into the abovementioned extruder, melted at 280° C. and homogenized, and the homogeneous melt was extruded after a mean residence time of 100 seconds and granulated. Test specimens were produced from the resultant granules by injection molding and used to measure the mechanical properties mentioned in the table below.

COMPARATIVE EXAMPLE III 60 parts by weight of component (A) and 10 parts by weight of component (C) were mixed at room temperature, the mixture was introduced into the abovementioned extruder, melted at 280° C., and 30 parts by weight of component (B) were introduced into the melt. After a mean residence time of 100 seconds, the homogeneous melt was extruded and granulated. Test specimens were produced from the resultant granules by injection molding and used to measure the mechanical properties indicated in the table below.

EXAMPLE 60 parts by weight of component (A) were introduced into the abovementioned extruder and melted at 280° C. 30 parts by weight of component (B) were introduced into the resultant melt at the same temperature and distributed to give a homogeneous mixture, and 10 parts by weight of component (C) were subsequently added at constant temperature. After an overall residence time of 100 seconds, the homogeneous melt was extruded and granulated. Test specimens were produced from the resultant granules by injection molding and used to measure the mechanical properties indicated in the table below.

TABLE

Mechanical properties of test specimens produced as indicated in Comparative Examples I to III and as indicated in the Example

| Test specimens prepared as indicated in | Modulus of elasticity in accordance with DIN 53457 [MPa] | Tensile strength in accordance with DIN 53457 [MPa] | Impact resistance in accordance with DIN 53453 [kJ/m$^2$] |
|---|---|---|---|
| Comparative Example I | 9705 | 170 | 30 |
| Comparative Example II | 7110 | 129 | 60 |
| Comparative Example III | 9030 | 133 | 42 |
| Example | 8950 | 152 | 59 |

We claim:

1. A process for the preparation of a reinforced, impact-modified thermoplastic molding composition containing, based on 100 parts by weight,
   A) from 30 to 93 parts by weight of one or more thermoplastics selected from the group consisting of the polyamides, polyesters, polycarbonates and polyphenylene ethers,
   B) from 5 to 50 parts by weight of fibers, and
   C) from 2 to 20 parts by weight of one or more impact-modifying rubbers. in which the fibers (B) are first introduced into the melt of the thermoplastic (A), components (A) and (B) are mixed, the rubber (C) is then introduced into the resultant mixture in the melt, and the resultant molding composition is extruded and granulated, wherein the compounding procedure is carried out in one step.

2. A process as claimed in claim 1, wherein the reinforced, impact-modified thermoplastic consists of, based on 100 parts by weight,
   A) from 30 to 93 parts by weight of one or more thermoplastics selected from the group consisting of the polyamides, polyesters, polycarbonates and polyphenylene ethers,
   B) from 5 to 50 parts by weight of fibers, and
   C) from 2 to 20 parts by weight of one or more impact-modifying rubbers.

3. A process as claimed in claim 1, wherein the compounding procedure is carried in one step at from 250° to 300° C.

4. The process as claimed in claim 1, wherein first the fibers (B) and then the rubber (C) are introduced into the melt of the thermoplastic (A), and the compounding procedure is carried out at a constant temperature in the range from 250° to 300° C.

5. A process as claimed in claim 1, wherein the thermoplastic (A) comprises, based on the total weight,
   A1) from 0 to 93% by weight of a thermoplastic polyamide,
   A2) from 0 to 93% by weight of a thermoplastic polyester,
   A3) from 0 to 93% by weight of a thermoplastic polycarbonate or
   A4) from 0 to 93% by weight of a thermoplastic polyphenylene ether or from 0 to 93% by weight of a mixture of two or more of the thermoplastics (A1) to (A4),
with the proviso that the proportion by weight of one of components (A1) to (A4) or of the mixture is from 30 to 93 parts by weight in 100 parts by weight of the molding composition.

6. A process as claimed in claim 1, wherein the fibers (B) used are glass fibers.

* * * * *